C. BROBST.
GREASE CUP.
APPLICATION FILED APR. 7, 1914.

1,155,879.

Patented Oct. 5, 1915.

Witnesses

Inventor
Charles Brobst
By W. N. Roach, Jr.
Attorney

UNITED STATES PATENT OFFICE.

CHARLES BROBST, OF PASCO, WASHINGTON.

GREASE-CUP.

1,155,879. Specification of Letters Patent. Patented Oct. 5, 1915.

Application filed April 7, 1914. Serial No. 830,170.

*To all whom it may concern:*

Be it known that I, CHARLES BROBST, a citizen of the United States of America, residing at Pasco, in the county of Franklin and State of Washington, have invented certain new and useful Improvements in Grease-Cups, of which the following is a specification.

This invention relates to grease cups and more particularly to that form of grease cup intended to contain thick grease which is expelled therefrom under pressure.

The objects of the invention are to provide a simple, cheap and efficient cup in which manually operated means are provided for expelling the grease therefrom, with resilient means auxiliary to said manually operated means.

With these and such other objects in view as may hereinafter more fully appear, my invention consists in the novel arrangement and construction of parts set forth in the following description, more particularly pointed out in the claim and which are shown in the accompanying drawings, wherein:—

Figure 1:
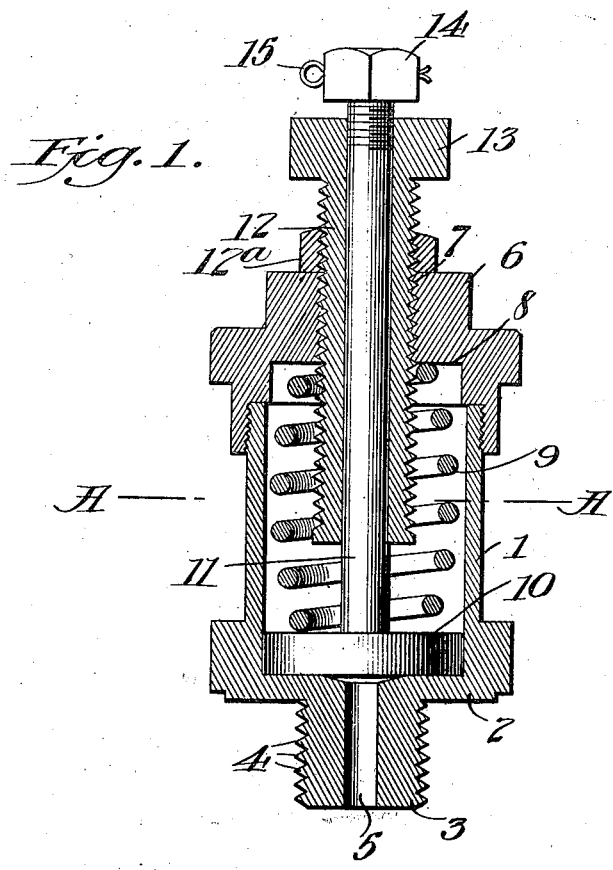
Figure 2:
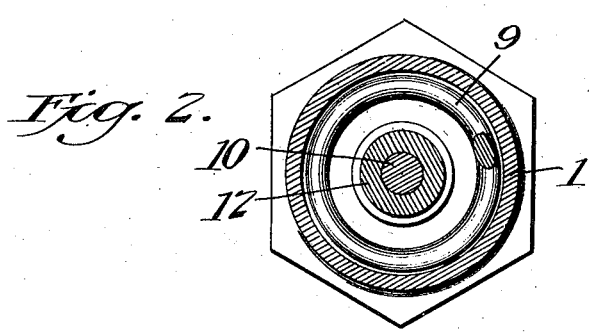

Figure 1 is a longitudinal sectional view of the device. Fig. 2 is a transverse sectional view taken on the line A—A of Fig. 1.

Referring to said drawings by numerals, a cylindrical cup 1 is provided at one end with a head 2 from the center of which extends an outwardly projecting cylindrical member 3. Member 3 is exteriorly threaded, as at 4, to provide suitable means for fastening the cup to the machinery or part to be oiled; and is also provided with a central bore 5 to permit discharge of the grease. The open end of cup 1 is exteriorly threaded to engage the threaded portion of a cap 6 which is adapted to be screwed on said cup. Cap 6 is centrally bored and tapped, as indicated at 7, and is provided, on its inner face with the countersunk portion 8 to form a chamber for the reception of a coiled spring 9 which is interposed between said cap and a piston 10. Coiled spring 9 is preferably formed as here shown, with reduced ends and enlarged center so that upon compression of the spring the same will not contact and injure the threads of the hereinafter described member 12. Piston 10 has a close sliding fit in the cup 1 and is carried by a piston rod 11 which is mounted for reciprocation in a hollow cylindrical member 12; said member being exteriorly threaded to engage the threads in the opening 7 of cap 6. Cylindrical member 12 is provided with a suitable head 13 adapted to be engaged by a wrench or other means for screwing said member in or out of said cup. The piston 11 may be provided with any suitable head, but as here shown, its free end is threaded for a short distance and a nut 14 screwed thereon; the nut and piston containing bores which may be brought into alinement and a key 15 inserted to lock the parts together.

The operation of the device is as follows:—The projection 3 is screwed into the part of the machine adapted to receive it; the cup filled with grease. The member 12 is screwed out to draw the piston to its highest point and the cap screwed on the cup. As the grease is used up the member 12 is screwed in, the end thereof contacting with the piston 10 and causing pressure thereon. Pressure is also exerted by the spring 9 which will serve to keep the grease in motion even after the pressure of member 12 is relieved by the expulsion of grease.

Having described my device, what I claim as new and desire to secure by Letters Patent, is:

In a grease cup provided with a suitable discharge part, a piston mounted for reciprocation within said cup, a cap for said cup provided with an interiorly threaded central opening, a hollow cylindrical member adapted to enter said opening and threaded to engage the threads thereof, a piston rod carried by the aforesaid piston and slidably mounted within said hollow cylindrical member, and a coiled spring interposed between the aforesaid cap and said piston and surrounding said hollow cylindrical member, said spring being larger at the center than at the ends thereof, for the purposes set forth.

In testimony whereof I hereunto affix my signature in presence of two witnesses.

CHARLES BROBST.

Witnesses:
WM. MARKS,
L. D. EUSTUS.